United States Patent [19]

Short, III et al.

[11] Patent Number: 5,036,632

[45] Date of Patent: Aug. 6, 1991

[54] PRESSURE RELIEF PANEL ASSEMBLY

[75] Inventors: Edward H. Short, III, Tulsa; Mitchel L. Rooker, Sand Springs; E. Bernel Sawyer, Tulsa, all of Okla.

[73] Assignee: BS&B Safety Systems, Inc., Tulsa, Okla.

[21] Appl. No.: 528,066

[22] Filed: May 14, 1990

[51] Int. Cl.$^5$ .............................................. E04B 1/00
[52] U.S. Cl. ............................................. 52/1; 52/98
[58] Field of Search ............... 52/1, 98, 99, 100, 208, 52/200; 220/89.1

[56] References Cited

U.S. PATENT DOCUMENTS

| | | | |
|---|---|---|---|
| 2,358,143 | 9/1944 | Castor | 220/89 |
| 2,980,286 | 10/1956 | Coffman | 220/89.1 |
| 3,972,442 | 8/1976 | Malcolm | 220/89 A |
| 4,067,154 | 1/1978 | Fike, Jr. | 52/99 |
| 4,207,913 | 6/1980 | Fike, Jr. | 137/68 R |
| 4,276,725 | 7/1981 | Ash | 51/1 |
| 4,498,261 | 2/1985 | Wilson et al. | 52/1 |
| 4,512,491 | 4/1985 | DeGood et al. | 220/89 |
| 4,612,739 | 9/1986 | Wilson | 52/1 |
| 4,656,793 | 4/1987 | Fons | 52/98 |
| 4,750,303 | 6/1988 | Mullen | 52/98 |
| 4,777,974 | 10/1988 | Swift et al. | 137/14 |
| 4,787,180 | 11/1988 | Robinson et al. | 52/200 |
| 4,821,909 | 4/1989 | Hibler et al. | 220/207 |

Primary Examiner—Richard E. Chilcot, Jr.
Assistant Examiner—Robert J. Canfield
Attorney, Agent, or Firm—Laney, Dougherty, Hessin & Beavers

[57] ABSTRACT

A pressure relief panel assembly including a single rupture panel is provided. The rupture panel includes a domed portion connected to a peripheral flat flange portion and has at least one slit formed therein defining a hinged blow-out part. The hinged blow-out part is connected to the remaining part of the rupture panel by an unslit hinge area and a plurality of rupture tabs.

14 Claims, 4 Drawing Sheets

PRESSURE RELIEF PANEL ASSEMBLY

BACKGROUND OF THE INVENTION

1. Field of the Invention

The present invention relates generally to pressure relief panel assemblies, and more particularly, to low pressure venting panels for preventing dangerous pressure build-ups in enclosures.

2. Description or the Prior Art

Pressure relief panel assemblies, sometimes referred to as explosion panels, have been developed and utilized heretofore. Such pressure relief panel assemblies are used to provide instantaneous low pressure relief to enclosures, such as tanks, food processing vessels, bag houses and the like, which are subject to rapid fluid pressure build-ups. For example, due to the collection of dust in bag houses, there is a constant risk of explosion. In order to prevent such explosions from causing severe damage to the bag house enclosure, equipment and personnel, one or more pressure relief panel assemblies are connected thereto which instantaneously rupture at relatively low pressures and provide large pressure relief openings through which pressurized burning gases are vented.

Pressure relief panel assemblies for preventing damage in the event of rapid pressure build-ups caused by explosions or other events have heretofore included composite rupture panels, i.e., panels made up of a number of parts which must rupture or open when pressurized fluid is relieved therethrough. For example, U.S. Pat. No. 4,498,261 issued Feb. 12, 1985 discloses a low pressure venting panel comprised of a rupture member having a plurality of slits and aperatures therein and a sealing membrane bonded to one side thereof. Both the rupture member and sealing membrane must rupture before opening of the panel is achieved.

U.S. Pat. No. 4,821,909 issued Apr. 18, 1989, another pressure relief assembly which utilizes a composite rupture panel, discloses a pressure relief panel comprised of a stainless steel member having slots which form lines of weakness therein and a sheet of plastic material bonded to one side of the stainless steel member.

Such prior composite rupture panels have tendencies to rupture at pressure differentials higher than expected in situations where extremely rapid pressure rises occur, e.g., an explosion. That is, because more than one part of the composite panel must rupture in order for the panel to open, the pressures required to rupture the individual parts can be additive rather than only that pressure which is required to rupture the strongest part.

In a number of applications, pressure relief panels are subjected to pressure-vacuum cycles, some as often as two or three cycles per minute. Such pressure-vacuum cycles cause the panels to flex which in turn often rapidly deteriorates composite panels causing them to fail prematurely.

Thus, there is a need for an improved pressure relief panel assembly comprised of a single rupture panel which reliably ruptures and opens at a predetermined pressure differential, and which can withstand pressure-vacuum cycles without premature deterioration or other adverse effect.

SUMMARY OF THE INVENTION

The present invention meets the need described above by providing an improved pressure relief panel assembly which includes a single domed rupture panel. That is, the assembly is comprised of a rupture panel having a domed portion connected to a peripheral flat flange portion and having at least one slit formed therein defining a hinged blow-out part in the rupture panel. The hinged blow-out part is connected to the remaining part of the rupture panel by an unslit hinge area and by a plurality of rupture tabs which rupture and allow the hinged blow-out part to open when a pressure differential of predetermined magnitude is exerted on the rupture panel.

A pair of gasket members are positioned on opposite sides of the peripheral flange portion of the rupture panel and extend inwardly over the slit or slits therein whereby the slit or slits are sealed by the gasket members when fluid pressure differentials are exerted on the panel. The slit or slits defining the hinged blow-out part in the panel are preferably positioned in or closely adjacent to the peripheral flat flange portion of the panel whereby the gasket members extend inwardly from the flat flange portion only a short distance.

Inlet and outlet complimentary rupture panel support members are provided adapted to be sealingly clamped together with the peripheral flange portion of the rupture panel and the gasket members therebetween, and adapted to be sealingly connected over a pressure relief vent.

It is, therefore, a general object of the present invention to provide an improved pressure relief panel assembly.

A further object of the present invention is the provision of an improved pressure relief panel assembly which includes a single domed rupture panel and which reliably and accurately ruptures at a predetermined pressure differential.

Another object of the present invention is the provision of an improved pressure relief panel assembly which can withstand pressure-vacuum cycles over a long period of time without appreciable adverse effect.

Other and further objects, features and advantages of the present invention will be readily apparent to those skilled in the art upon a reading of the description of preferred embodiments which follows when taken in conjunction with the accompanying drawings.

DESCRIPTION OF PREFERRED EMBODIMENTS

The present invention provides an improved pressure relief panel assembly which includes a single domed rupture panel having at least one slit formed therein defining a hinged blow-out part in the rupture panel. The term "slit" is used herein to mean an elongated cut of narrow thickness formed in the rupture panel and extending therethrough. The term "hinged blow-out part" is used herein to mean a portion of the rupture panel defined by one or more slits therein which includes an unslit area which functions as a hinge. That is, upon rupture the blow-out part is moved away from the remaining part of the rupture panel but bends at and remains attached to the remaining part at the hinge formed by the unslit area. The term "rupture tab(s)" is used herein to mean the unslit portions of the rupture panel between intermittent slits or separate rupturable connectors attached between the blow-out part and the remaining part of a rupture panel. The rupture tabs have predetermined strengths whereby they tear or otherwise rupture and allow the blow-out part to open when a pressure differential of predetermined magnitude is exerted thereon.

Figure 1:
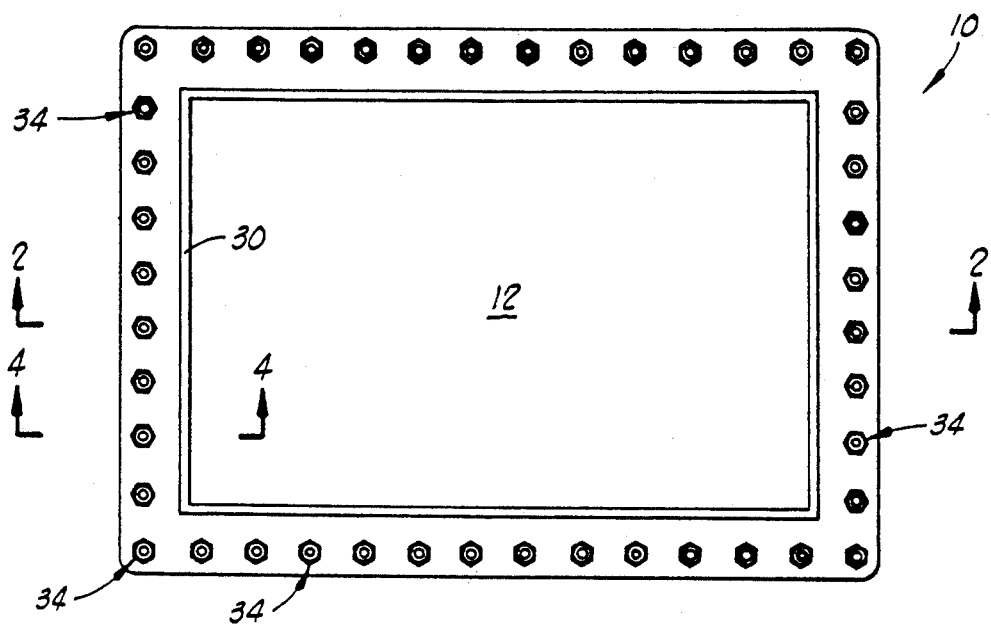
FIG. 1 is a plan-view of the inlet side of a pressure relief panel assembly of the present invention.
Figure 2:
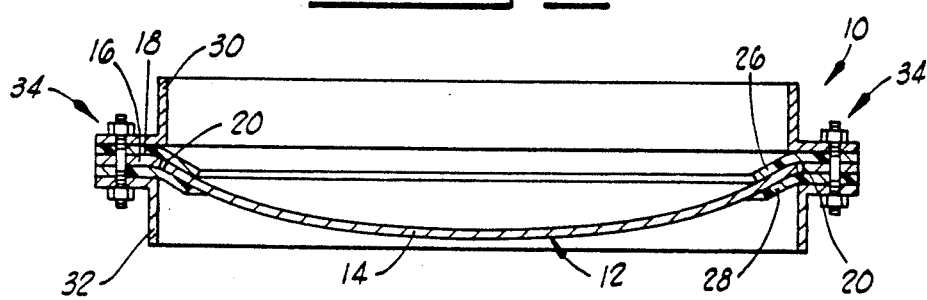
FIG. 2 is a cross-sectional view taken along line 2—2 of FIG. 1.
Figure 3:
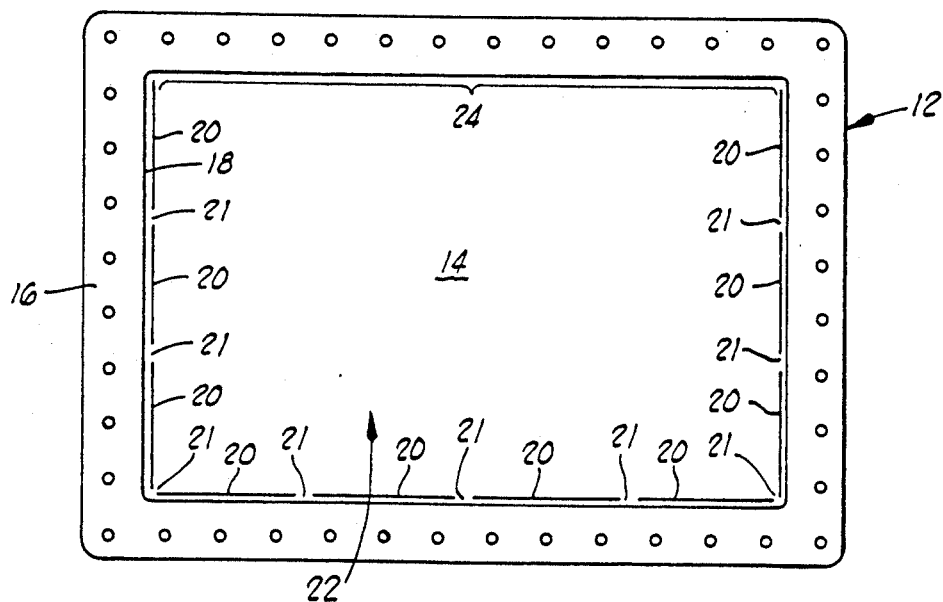
FIG. 3 is a plan-view of the inlet side of the rupture panel of the assembly illustrated in FIGS. 1 and 2.
Figure 4:
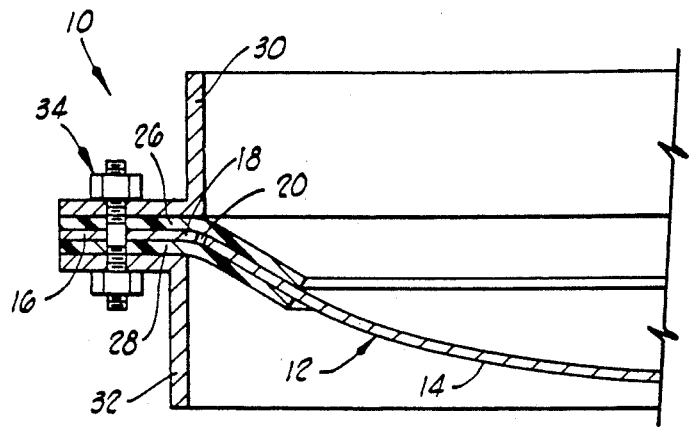
FIG. 4 is an enlarged partial cross-sectional view taken along line 4—4 of FIG. 1.

Referring now to the drawings, and particularly to FIGS. 1–5, a pressure relief panel assembly of the present invention is illustrated and generally designated by the numeral 10. The assembly 10 includes a rupture panel 12 (shown separately in FIG. 3) which has a domed portion 14 connected to a peripheral flat flange portion 16 by a transition connection 18. The rupture panel 12 and the assembly 10 are preferably rectangular as illustrated in the drawings, but as will be understood by those skilled in the art other shapes can be utilized, e.g., circular, square, etc. As best shown in FIGS. 3 and 4, the rupture panel 12 includes intermittent slits 20 formed therein and positioned adjacent to sections of the flat flange portion 16 of the rupture panel 12. The slits 20 define a substantially rectangular hinged blow-out part 22 (FIG. 3) in the rupture panel 12. That is, the intermittent slits 20 define three sides of the substantially rectangular blow-out part 22 with the fourth unslit side (designated by the numeral 24 in FIG. 3) comprising the hinge by which the hinged blow-out part 22 is connected to the remaining part of the rupture panel 12. The unslit portions of the rupture panel 12 between the intermittent slits 20 define rupture tabs 21 in the rupture panel 12.

Gasket members 26 and 28 are positioned on opposite sides of the peripheral flange portion 16 of the rupture panel 12 and extend inwardly over the intermittent slits 20 as best illustrated in FIGS. 3 and 4. The gasket members 26 and 28 are formed of highly weather and chemical resistant flexible material, e.g., a silicone based material, and seal the intermittent slits 20 when fluid pressure differentials are exerted on the rupture panel 12. The term "pressure differential" is used herein to mean the difference in fluid pressures exerted on the inlet and outlet sides of the rupture panel 12, e.g., a pressure of 20 psi. on the inlet side and atmospheric pressure (14.7 psia.) on the outlet side produces a pressure differential of 5.3 psia. The term "reverse pressure differential" is used herein to specifically describe the situations where the pressure on the outlet side of the rupture panel is greater than the pressure on the inlet side, e.g., atmospheric on the outlet side and a vacuum on the inlet side.

An inlet rupture panel support member 30 and a complimentary outlet rupture panel support member 32 are positioned adjacent the gasket members 26 and 28, respectively, and the peripheral flat flange portion 16 of the rupture panel 12 and the gasket members 26 and 28 are sealingly clamped between the inlet and outlet support members 30 and 32 by a plurality of studs and nuts, generally designated by the numeral 34. As will be understood, the studs extend through complimentary openings in the peripheral flange portion 16 of the rupture panel 12, the gasket members 26 and 28 and the support members 30 and 32. As best shown in FIG. 2, the supporting surface of the inlet support member 30 extends inwardly past the transition connection 18 of the rupture panel 12 so that the transition connection 18 is supported thereby during reverse pressure differentials.

In operation of the assembly 10, the inlet rupture panel support member 30 is sealingly connected to a complimentary vent opening, such as by welding, provided in a vessel, bag house or other enclosure to be protected. As shown best in FIG. 2, the rupture panel 12 is positioned within the assembly 10 whereby the concave side of the rupture panel 12 faces the inlet support member 30. When the enclosure to which the assembly 10 is attached contains a positive fluid pressure, the resultant pressure differential is exerted on the concave side of the rupture panel 12. Because the gasket member 26 extends inwardly over the intermittent slits 20 in the rupture panel 12, the pressure differential exerted on the rupture panel 12 forces the gasket member 26 against the rupture panel 12 whereby the slits 20 are sealed thereby and pressurized fluid is prevented from passing therethrough. When a reverse pressure differential is exerted on the rupture panel 12, the gasket member 28 is forced against the rupture panel 12 whereby the slits 20 are sealed thereby. During a reverse pressure differential and because of the concave-convex shape of the domed portion 14 of the rupture panel 12, the domed portion 14 is in compression and the transition connection 18 of the rupture panel 12 is supported by the surface of the support member 30 adjacent thereto. Such support of the transition connection when the domed portion 14 is in compression prevents the reversal of the rupture panel 12.

As stated above, the unslit portions of the rupture panel 12 between the intermittent slits 20 form rupture tabs 21 between the hinged blow-out part 22 and the remaining part of the rupture panel. The thickness of the material of which the rupture panel is formed and the distance between the slits 20 determine the strengths of the rupture tabs 21 and the pressure differential required to cause their rupture and the opening of the hinged blow-out part 22. Such pressure differential is predetermined by trial and error manufacturing techniques well known to those skilled in the art.

Figure 5:
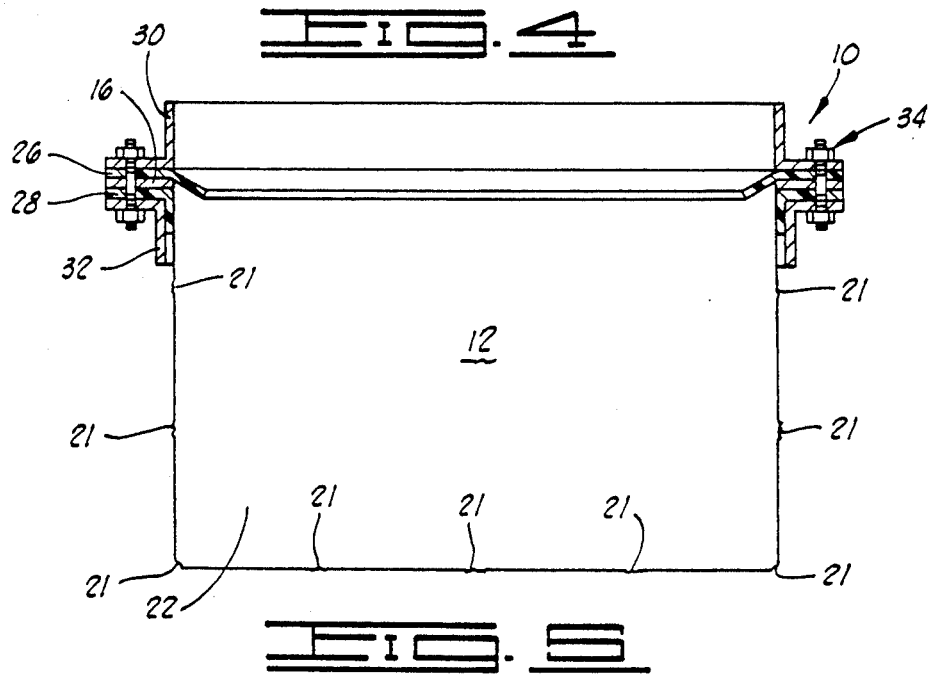
FIG. 5 is a cross-sectional view similar to FIG. 2, but illustrating the assembly after rupture and opening of the rupture panel thereof.

When a pressure differential is exerted on the assembly 10, i.e., a positive pressure is exerted on the concave side of the rupture panel 12, the rupture panel is placed in tension and tensile shearing forces are exerted on the rupture tabs 21. When the pressure differential reaches the predetermined magnitude at which the strengths of one or more of the rupture tabs 21 are exceeded, rupture occurs and the blow-out part 22 bends outwardly from the remaining part of the rupture panel 12 at the hinge area 24 as shown in FIG. 5. The opening of the hinged blow-out part 22 relieves fluid pressure from the enclosure to which the assembly 10 is attached, and because the rupture panel 12 and blow-out part 22 thereof are large, such pressure relief is substantially instantaneous.

As will be understood by those skilled in the art, one or more of the rupture tabs 21 can be made to control the opening of the rupture panel 12 by making the ends of the slits 20 defining such rupture tabs closer together than the ends of the slits defining other rupture tabs. Also, by selecting the rupture tab(s) 21 under the greatest load as the tab(s) which control the opening of the rupture panel 12, the other tabs can be of reduced strength which allows the rupture panel 12 to open fully more rapidly.

As will also be understood, the number and configuration of the slits 20 can be varied and apertures can be formed at the ends of the slits in order to provide better control of the pressure differential at which the rupture tabs 21 rupture. Apertures can also be formed in the solid rupture tab portions of the panel 12 to reduce their strength if desired.

Figure 6:
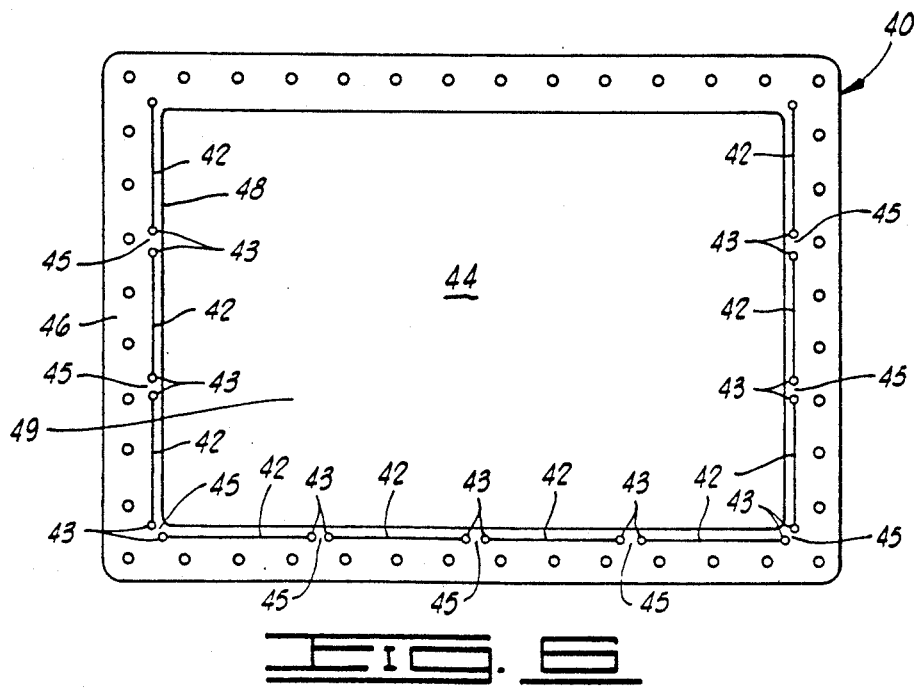
FIG. 6 is a plan-view of the inlet side of an alternate embodiment of the rupture panel of the present invention.

Referring to FIG. 6, a rupture panel 40 is illustrated which includes an alternate arrangement of intermittent slits 42. Like the rupture panel 12, the rupture panel 40 includes a domed portion 44 and a peripheral flat flange portion 46 connected by a transition connection 48. The slits 42 are positioned in three consecutive side sections of the flat flange portion 46 of the rupture panel 40 and apertures 43 are provided at the ends of the slits 42. Thus, the slits 42 define three sides of a substantially rectangular blow-out part 49 which is hinged to the remaining part of the rupture panel 40 by the unslit fourth side. Rupture tabs 45 are formed between the apertures 43, the strengths of which can be readily reduced by enlarging the apertures 43.

Figure 7:
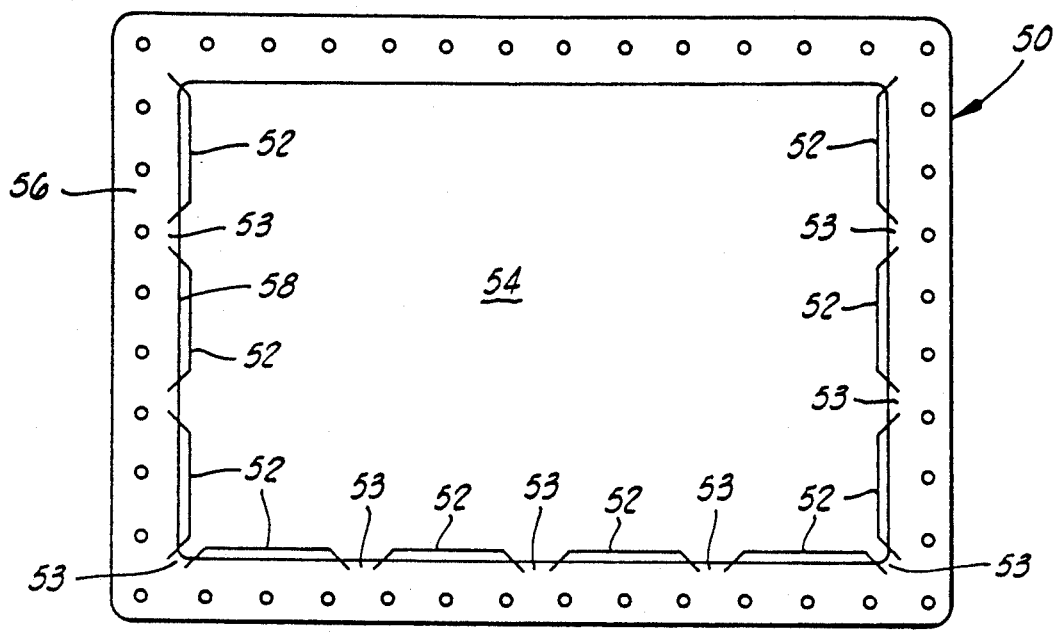
FIG. 7 is a plan-view of the inlet side of another alternate embodiment of the rupture panel of the present invention.

Referring now to FIG. 7, a rupture panel 50 is illustrated including another alternate arrangement of intermittent slits 52, i.e., the slits 52 are of truncated V-shapes. The rupture panel 50 includes a domed portion 54 connected to a peripheral flat flange portion 56 by a transition connection 58. The truncated V-shaped slits 52 are positioned so that the truncated parts of the slits 52 lie within the domed portion 54 of the rupture panel 12 adjacent the transition connection 58. The side parts of the slits 52 forming the V-shapes extend to positions within the flat flange portion 56 of the rupture disk 12 where flexing brought about by pressure-vacuum cycles is minimized thereby minimizing the deterioration of the rupture panel 50 and the weakening of the rupture tabs 53 formed therein between the slits 52.

Figure 8:
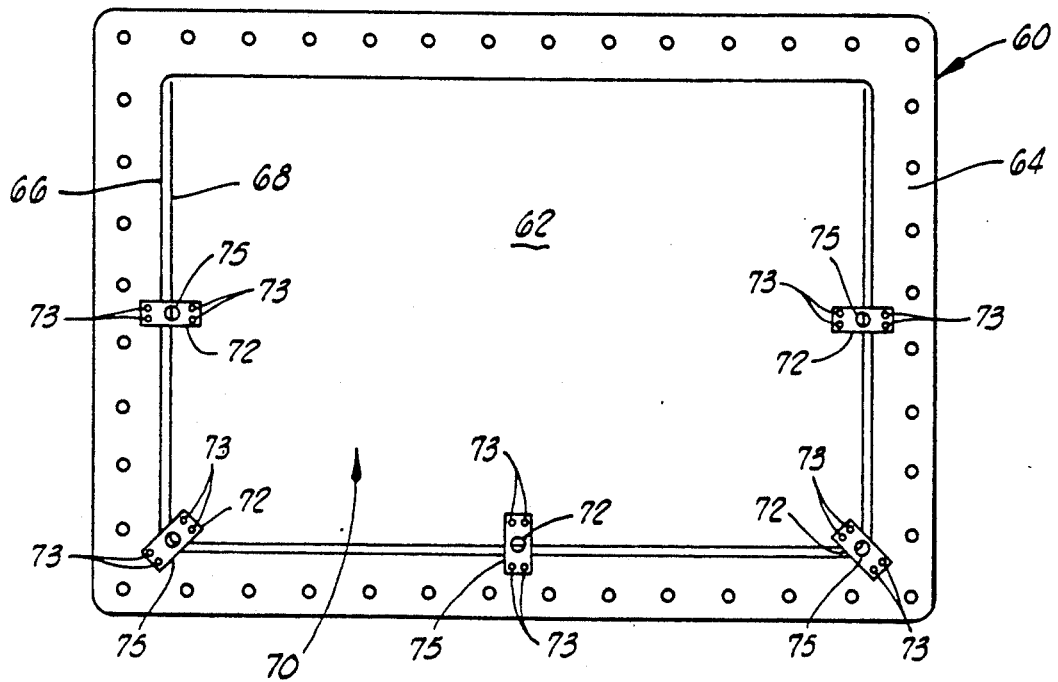
FIG. 8 is a plan-view of the inlet side of still another alternate embodiment of the rupture panel of the present invention.

Referring now to FIG. 8, a rupture panel 60 including still another alternate slit and rupture tab arrangement is illustrated having a domed portion 62 connected to a peripheral flange portion 64 by a transition connection 66. A single continuous slit 68 is formed in the domed portion 62 of the rupture panel 60 adjacent three consecutive sections of the peripheral flange portion 64 thereof whereby a substantially rectangular hinged blow-out part 70 is formed in the rupture panel 60. Instead of rupture tabs formed integrally in the rupture panel 60 by intermittent slits, separate connector type rupture tabs 72 are attached to the rupture panel 60, such as by spot welds 73, across the slit 68 at intervals therealong whereby the hinged blow-out part 70 is connected to the remaining part of the rupture panel 60 by the tabs 72. The strengths of the tabs 72 can be controlled using various techniques such as by forming apertures 75 therein. Also wires or other types of spot welded connectors can be substituted for the tabs 72.

Figure 9:
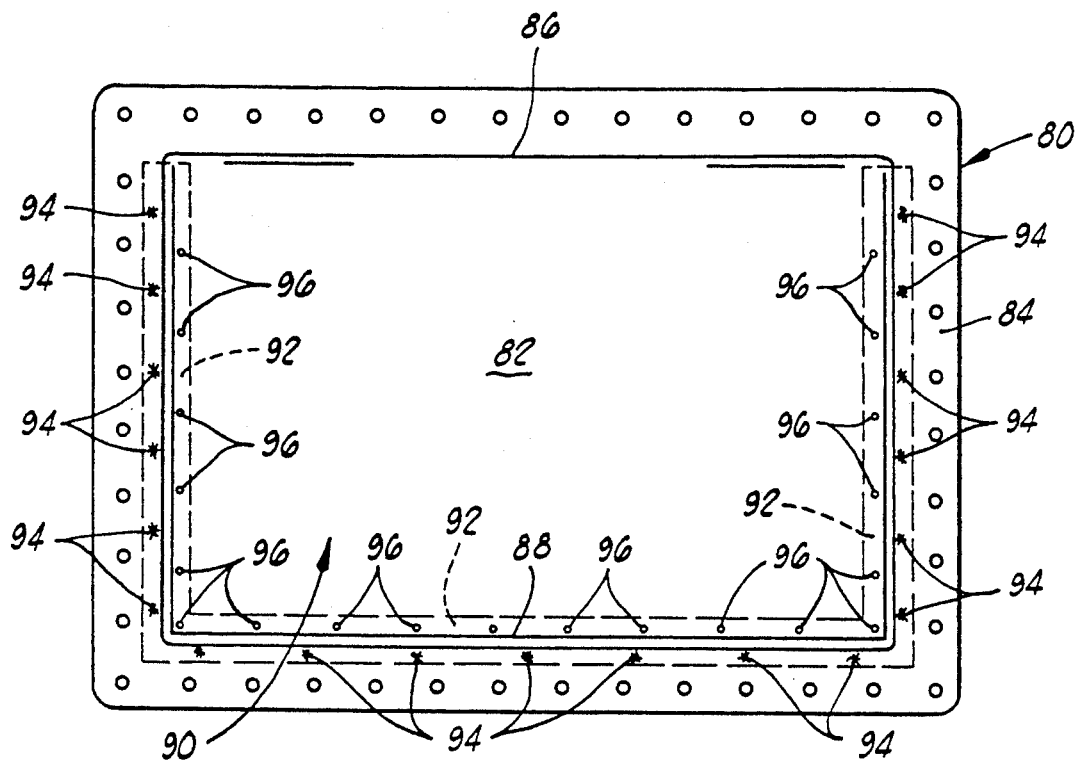
FIG. 9 is a plan-view of the outlet side of yet another alternate embodiment of the rupture panel of the present invention.
Figure 10:
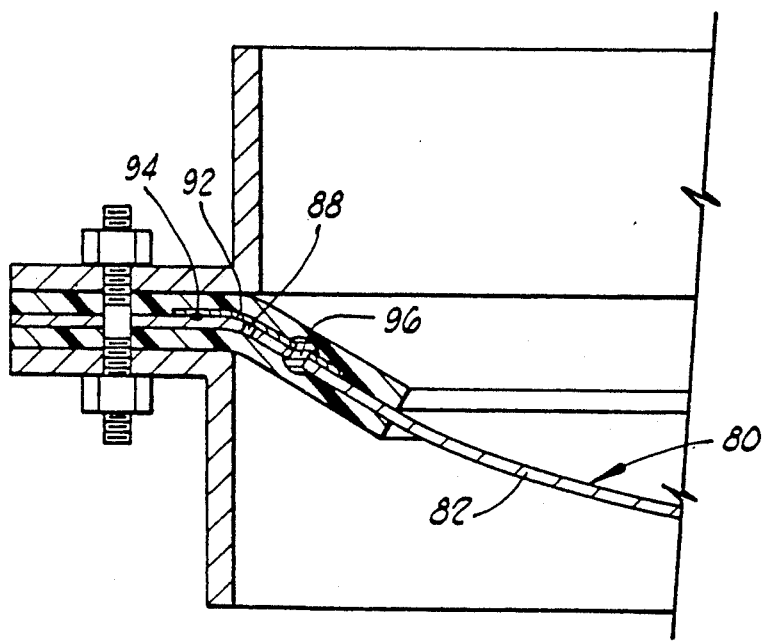
FIG. 10 is an enlarged partial cross-sectional view of a pressure relief panel assembly of the present invention including the rupture panel illustrated in FIG. 9.

Referring now to FIGS. 9 and 10, a rupture panel 80 including yet another alternate slit and rupture tab arrangement is illustrated having a domed portion 82 connected to a peripheral flange portion 84 by a transition connection 86. A single continuous slit 88 is formed in the domed portion 82 of the rupture panel 80 adjacent three consecutive sections of the peripheral flange portion 84 thereof whereby a substantially rectangular hinged blow-out part 90 is formed in rupture panel 80. Instead of spot welded rupture tabs or the like, the rupture panel 80 includes a back-up strip 92 spot welded to the previously mentioned three consecutive sections of the peripheral flange portion 84 thereof by a plurality of spot-welds 94. The back-up strip 92 extends over the continuous slit 88 and conforms in configuration to the transition connection 86 and domed portion 82 of the rupture panel 80. A plurality of rivits 96 extend through aligned openings in the back-up strip 92 and domed portion 82 of the rupture panel 80 at intervals therealong whereby the hinged blow-out part 90 is connected to the remaining part of the rupture panel 80 by the rivits 96. In this arrangement, the rivits 96 are the rupture tabs and function in the same way as the various other forms of rupture tabs described above. That is, the strengths of the rivits 96, which can be varied by changing the size of thereof, determine the particular pressure differential at which the rupture panel 80 will open. As shown in FIG. 10, gasket members 98 and 100 cover the slit 88, the rivits 96 and the strip 92.

Pressure relief panel assemblies including the rupture panels 40, 50, 60 and 80 operate in the same manner as the assembly 10 described above. That is, the rupture tabs 45, 53, 72 and 96 (rivits), respectively, rupture when pressure differentials of predetermined magnitudes are exerted on the rupture panels 40, 50, 60 and 80. The rupture of the rupture tabs allows the hinged blow-out parts of the panels to open and fluid pressures to be relieved therethrough.

Thus, the present invention is well adapted to carry out the objects and attain the objects and advantages mentioned as well as those inherent therein. While numerous changes can be made in the construction and arrangement of parts, such changes are encompassed within the spirit of this invention as defined by the appended claims.

What is claimed is:
1. A pressure relief panel assembly comprising
a rupture panel having a domed portion connected to a peripheral flat flange portion and having at least one slit formed therein defining a hinged blow-out part in said rupture panel, said hinged blow-out part being connected to the remaining part of said rupture panel by an unslit hinge area and by a plurality of rupture tabs which rupture and allow said hinged blow-out part to open when a pressure differential of predetermined magnitude is exerted on said rupture panel;
a pair of peripheral gasket members positioned on opposite sides of said peripheral flange portion of said rupture panel and extending inwardly over said slit, said gasket members being unattached to said rupture panel over said slit such that said slit is sealed by said gasket members when fluid pressure differentials are exerted on said panel and only the rupture of the rupture tabs is required to allow said hinged blow-out part to open; and inlet and outlet complimentary rupture panel support members adapted to be sealingly clamped together with said peripheral flange portion of said rupture panel and said gasket members therebetween, and adapted to be sealingly connected over a pressure relief vent.

2. The assembly of claim 1 wherein said hinged blow-out part is defined by a plurality of intermittent slits formed in said rupture panel, and said rupture tabs are comprised of the unslit portions of said panel between said intermittent slits.

3. The assembly of claim 2 which is further characterized to include apertures formed in said panel at the ends of said intermittent slits.

4. The assembly of claim 1 wherein said hinged blow-out part is defined by a single slit and said rupture tabs are comprised of separate connectors attached to said blow-out part and to said remaining part of said rupture panel.

5. The assembly of claim 1 wherein said rupture panel, said hinged blow-out part and said inlet and outlet rupture panel support members are all of substantially retangular shapes.

6. The assembly of claim 1 wherein said gasket members are formed of flexible materials and are bonded to said rupture panel.

7. The assembly of claim 1 wherein said inlet rupture panel support member is positioned on the concave side of said rupture panel.

8. The assembly of claim 7 wherein said domed portion of said rupture panel is connected to the peripheral flange portion thereof by a transition connection and said inlet rupture panel support member extends inwardly past said transition connection whereby said transition connection is supported by said inlet support member when reverse pressure differential is exerted on said rupture panel.

9. A pressure relief panel assembly comprising:

a rupture panel having a domed portion connected to a peripheral flat flange portion by a transition connection and having intermittent slits formed therein positioned in or adjacent to said flat flange portion and defining a hinged blow-out part in said rupture panel, said intermittent slits being spaced from each other at predetermined distances forming rupture tabs in said rupture panel whereby said rupture panel tears at said rupture tabs and said hinged blow-out part opens when a pressure differential of predetermined magnitude is exerted, thereon;

a pair of peripheral gasket members positioned on opposite sides of said peripheral flange portion of said rupture panel and extending inwardly over said transition connection and over said intermittent slits whereby said slits are sealed by said gasket members when fluid pressure differentials are exerted on said panel; and inlet and outlet complimentary rupture panel support members adapted to be sealingly clamped together with said peripheral flange portion of said rupture panel and said gasket members therebetween and adapted to be sealingly connected over a pressure relief vent.

10. The assembly of claim 9 which is further characterized to include aperatures formed in said panel at the ends of said intermittent slits, said gasket members being unattached to said rupture panel over said slits such that.

11. The assembly of claim 10 wherein said rupture panel and only the rupture of the rupture tabs is required to allow said blow-out part to open said hinged blow-out part and said inlet and outlet rupture panel support members are all of substantially rectangular shapes.

12. The assembly of claim 11 wherein said gasket members are formed of flexible materials and are bonded to said rupture panel.

13. The assembly of claim 12 wherein said inlet rupture panel support member is positioned on the concave side of said rupture panel.

14. The assembly of claim 13 wherein said inlet rupture panel support member extends inwardly past said transition connection in said rupture panel whereby said transition connection is supported by said inlet support member when reverse pressure differential is exerted on said rupture panel.

* * * * *

UNITED STATES PATENT AND TRADEMARK OFFICE
CERTIFICATE OF CORRECTION

PATENT NO.  : 5,036,632
DATED       : August 6, 1991
INVENTOR(S) : Edward H. Short, III et al.

It is certified that error appears in the above-identified patent and that said Letters Patent is hereby corrected as shown below:

Column 8, line 12, after "slits" first occurrence insert
--, said gasket members being unattached to said rupture panel over said slits such that-- and delete "whereby"

Column 8, line 14, after "panel" insert --and only the rupture of the rupture tabs is required to allow said blow-out part to open--

Column 8, line 23, after "slits" delete --, said gasket members being unattached to said rupture panel over said slits such that--

Column 8, line 27, after "panel" insert --,-- and delete --and only the rupture of the rupture tabs is required to allow said blow-out part to open--

Signed and Sealed this

Nineteenth Day of January, 1993

*Attest:*

DOUGLAS B. COMER

*Attesting Officer*      *Acting Commissioner of Patents and Trademarks*